March 12, 1929.

J. MLINKO 1,704,803

DIFFERENTIAL GEAR FOR MOTOR VEHICLES

Filed Dec. 29, 1927

Inventor.
Janos Mlinko
By Marks + Clerk
Attys.

Patented Mar. 12, 1929.

1,704,803

UNITED STATES PATENT OFFICE.

JÁNOS MLINKO, OF HEVES, HUNGARY.

DIFFERENTIAL GEAR FOR MOTOR VEHICLES.

Application filed December 29, 1927, Serial No. 243,435, and in Hungary January 12, 1927.

It is known that when running round curves the steering of automobile vehicles with differential gear presents difficulties if the driving motor is connected. On the curve, the wheel running on the outside of the track has to describe a longer path and consequently tends to make the planet pinions and the gear overrun the motor or to make the other road wheel revolve backwards. The torque of the road wheel is, however, not sufficient to accelerate all the masses, including the engine shaft, in the overrunning direction, so the wheel in question is constrained to slip on the road surface, thereby giving rise to deviations from the desired direction, or, in the case of rather high speeds, to skidding.

The present invention relates to an arrangement wherein, in the event of one of the driving wheels overrunning, the differential gear is uncoupled from the driving shaft, and can rotate freely to a limited extent beside both wheels. For this purpose, between the differential gear casing and the member driving this casing, is interposed a clutch which allows a limited amount of overrunning, but which is operative in both directions of rotation. The form of the clutch is optional.

Driving devices are already known in which the driven shaft is driven through ratchet gearing, which allows the driven member to overrun the driving member, but these devices exhibit the disadvantage that they permit an unlimited overrunning of the driven member, which renders braking by means of the motor impossible.

Furthermore, driving backwards with such devices is precluded without the provision of a special clutch which becomes operative upon the reversing gear being put in.

It has also been proposed to insert, as a substitute for the differential, a clutch for each wheel, which permits one driving wheel to overrun at times, while the other driving wheel remains coupled to the driving member.

Owing to this wheel, however, unfavourable reactions upon the gear and the motor are still possible. It has also been proposed to insert free-wheel clutches in the driving mechanism, in which are included springs acting in both directions of rotation. These have the disadvantage that the springs always exert a reaction, and thus either cause the driving wheels to slip when they are driving them forwards, or else retard the motor and flywheel, this action taking place more particularly at dead-centre positions and only being overcome by the provision of rather heavy flywheels.

Figure 1:
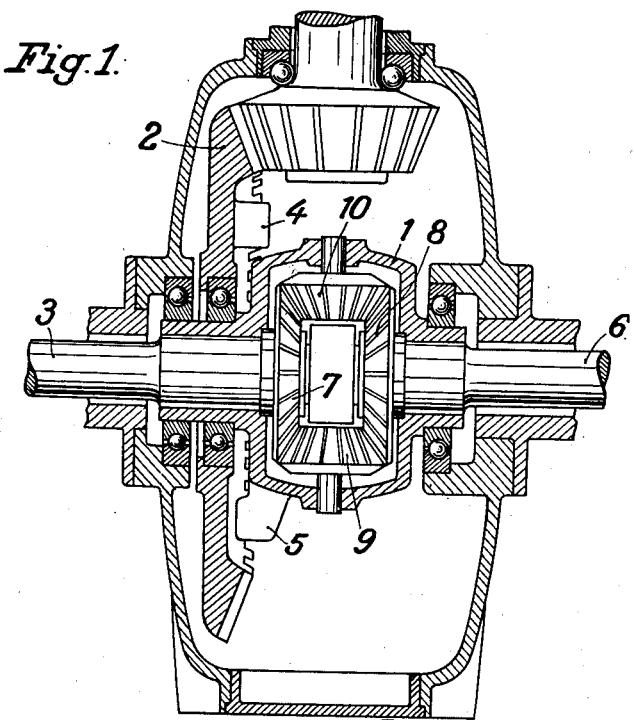
Figure 2:
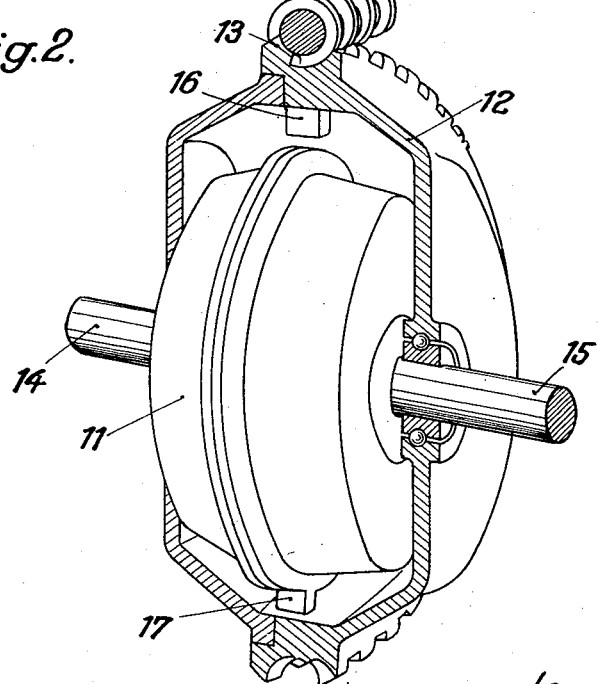

Two constructional examples of the present invention are illustrated in the accompanying drawings, wherein Figure 1 shows a differential gear with plate wheel in cross section and Figure 2 shows a differential gear with worm drive.

In the constructional form according to Figure 1 the yielding clutch is inserted between the casing 1 and the plate wheel 2. For this purpose the plate wheel is separated from the casing 1 and rotatably mounted on a sleeved extension of the said casing on the driving shaft 3. On the inner side of the plate wheel or driving wheel 2 facing the differential casing is provided a claw 4 which drives the casing by means of a co-acting claw 5 arranged thereon. For the sake of clearness this co-acting claw 5 is shown in the drawing rotated through 180° in relation to the claw 4. The second driving shaft is denoted by 6, the differential wheels by 7 and 8 and the planet pinions by 9 and 10.

When the vehicle is travelling in a straight line the claw 4 takes the differential casing with it and the device works like an ordinary differential gear with a fixed plate wheel. When, however, one differential wheel has to overrun the other from any cause, for instance when the vehicle is travelling round a curve, or one road wheel is passing over an obstacle, the friction at the periphery of this wheel being wholly or partly eliminated, the wheel also drives the differential casing in an overrunning direction, the abutment 5 overrunning the claw 4 and the planet pinions 9 and 10 rolling round the second differential wheel, which latter however, is in no way hindered from rotating. As a minimum range for the overrunning may be taken about 300°, if 60° is deducted from the circular path for the breadth of the claw and its abutment. This dimension corresponds, in the case of the usual transmission ratios, to about 2.5 metres on the periphery of the road wheel, which is, in general, sufficient when travelling round curves. In point of fact, however, a far greater degree of overrunning is rendered possible owing to the fact that the motor, which is running idle owing to the release of the clutches 4, 5, increases its speed of revolution, while the speed of the vehicle decreases for lack of drive, so that the claw 4 overruns the abutment 5. If the speed of the vehicle is not too great, or if it is travelling round a curve having a large radius of curvature, it may even happen that the claw 4 follows the abutment 5 with almost the same velocity. In general, the actual overrunning will always be such that the dimension of 300° yielded by the construction is sufficient. Consequently a plurality of claws may be provided on the plate wheel and a corresponding number of abutments on the differential gear casing, without any disadvantage as regards flexibility.

Figure 2 shows another constructional example wherein the differential gear casing 11 is fitted into a second casing 12 which carries a worm driving wheel 13 and is rotatably supported on driving shafts 14 and 15. The dog clutch is arranged between the two casings 11 and 12, the claw 16 being mounted on the worm wheel casing 12 and the co-acting abutment 17 on the periphery of the differential gear casing 11.

What I claim is:—

1. An appliance for the differential gears of automobile vehicles to enable the driving shafts to overrun the motor shaft, comprising a free wheel clutch interposed between the differential gear casing and the motor shaft driving said casing, said clutch being adapted to permit a limited amount of overrunning and to engage in both directions of rotation without resilient reaction.

2. An appliance for the differential gears of automobile vehicles to enable the driving shafts to overrun the motor shaft, comprising a driving wheel for driving the differential casing, supporting means for the differential casing, separate supporting means for the driving wheel, and a free wheel clutch interposed between the differential gear casing and the driving wheel driving said casing, said clutch being adapted to permit a limited amount of overrunning and to engage in both directions of rotation without resilient reaction.

3. An appliance for the differential gears of automobile vehicles to enable the driving shafts to overrun the motor shaft, comprising a second casing enclosing the differential gear casing and rotatably mounted upon the driving shafts, a worm wheel secured to said second casing and adapted to be driven by a worm on the motor shaft, and a free wheel clutch interposed between the differential gear casing and the second casing, said clutch being adapted to permit a limited amount of overrunning and to engage in both directions of rotation without resilient reaction.

In testimony whereof I have signed my name to this specification.

JÁNOS MLINKO.